(12) United States Patent
Chang et al.

(10) Patent No.: US 8,358,465 B2
(45) Date of Patent: Jan. 22, 2013

(54) SYSTEM AND METHOD FOR DISPLAYING THREE-DIMENSIONAL IMAGE

(75) Inventors: Jin Wook Chang, Seoul (KR); Kyoung Il Lee, Seoul (KR); Tae Soo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 7 days.

(21) Appl. No.: 11/545,762

(22) Filed: Oct. 11, 2006

(65) Prior Publication Data

US 2007/0081208 A1 Apr. 12, 2007

(30) Foreign Application Priority Data

Oct. 12, 2005 (KR) .................. 10-2005-0096030

(51) Int. Cl.
*G02B 27/22* (2006.01)
(52) U.S. Cl. ......................... 359/464; 359/462
(58) Field of Classification Search .................. None
See application file for complete search history.

(56) References Cited

U.S. PATENT DOCUMENTS

| | | | | |
|---|---|---|---|---|
| 5,315,377 A * | 5/1994 | Isono et al. | ........... | 348/51 |
| 5,410,345 A * | 4/1995 | Eichenlaub | ........... | 348/59 |
| 5,969,850 A * | 10/1999 | Harrold et al. | ........... | 359/320 |
| 2004/0245440 A1 | 12/2004 | Klippstein et al. | | |
| 2006/0082519 A1 * | 4/2006 | Nam et al. | ........... | 345/9 |
| 2006/0126177 A1 * | 6/2006 | Kim et al. | ........... | 359/465 |
| 2008/0043092 A1 * | 2/2008 | Evans et al. | ........... | 348/36 |

FOREIGN PATENT DOCUMENTS

| | | |
|---|---|---|
| CN | 1487331 A | 4/2004 |
| CN | 1552162 A | 12/2004 |
| DE | 20022456 U1 * | 10/2001 |
| EP | 0 833 183 A1 | 4/1998 |
| EP | 1 394 593 A1 | 3/2004 |
| EP | 1394593 | 3/2004 |
| EP | 1 650 983 A1 | 4/2006 |
| EP | 1 662 808 A1 | 5/2006 |
| GB | 2 415 849 A | 1/2006 |
| JP | 7312759 | 11/1995 |
| JP | 9159970 | 6/1997 |
| JP | 10-078563 | 3/1998 |
| JP | 10-142572 A | 5/1998 |
| JP | 2902957 | 6/1999 |
| JP | 2001156893 | 6/2001 |

(Continued)

OTHER PUBLICATIONS

Full English Translation of DE20022456 U1, Oct. 2001.*

*Primary Examiner* — Lee Fineman
(74) *Attorney, Agent, or Firm* — McKenna Long & Aldridge LLP

(57) ABSTRACT

A three-dimensional (3D) display system and a method for use in the same are disclosed. The 3D display system includes: a display panel which includes a plurality of pixels, applies several-direction parallax image signals to the pixels according to regulations of a specific mode, and displays the several-direction parallax image signals; and a filter which is located at at least one of a front part and a rear part of the display panel, forms a predetermined barrier pattern according to regulations of the specific mode to implement a three-dimensional image, and separates the several-direction parallax image signals from each other.

8 Claims, 5 Drawing Sheets

FOREIGN PATENT DOCUMENTS

| | | |
|---|---|---|
| JP | 2003319043 | 11/2003 |
| JP | 2005172925 | 6/2005 |
| JP | 2005266333 | 9/2005 |
| KR | 10-2001-0056539 | 7/2001 |
| KR | 10-2003-0087310 | 11/2003 |
| KR | 10-2005-0084957 | 8/2005 |
| KR | 10-2006-0048022 | 5/2006 |
| WO | WO 156302 A1 * | 8/2001 |
| WO | WO 03/024122 A1 | 3/2003 |
| WO | WO 2004/046789 A1 | 6/2004 |

* cited by examiner (b)

| 1 | 2 | 3 | 1 | 2 | 3 | 1 | 2 |
|---|---|---|---|---|---|---|---|
| 2 | 3 | 1 | 2 | 3 | 1 | 2 | 3 |
| 3 | 1 | 2 | 3 | 1 | 2 | 3 | 1 |
| 1 | 2 | 3 | 1 | 2 | 3 | 1 | 2 |
| 2 | 3 | 1 | 2 | 3 | 1 | 2 | 3 |
| 3 | 1 | 2 | 3 | 1 | 2 | 3 | 1 |

SYSTEM AND METHOD FOR DISPLAYING THREE-DIMENSIONAL IMAGE

This application claims the benefit of Korean Patent Application No. P2005-0096030, filed on Oct. 12, 2005 which is hereby incorporated by reference as if fully set forth herein.

BACKGROUND OF THE INVENTION

1. Field of the Invention

The present invention relates to a system and method for displaying a three-dimensional image, and more particularly to a system and method for a three-dimensional image using a three-dimensional filter.

2. Discussion of the Related Art

In recent times, a variety of three-dimensional image display systems have recently been developed to display three-dimensional images or stereoscopic images.

Generally, in order to allow a viewer to effectively view a three-dimensional image, different images are applied to two eyes (i.e., the right and left eyes) of the viewer, and the right and left images are combined with each other in a brain of the viewer, such that the viewer can view a three-dimensional or stereoscopic image similar to a real image of an object.

In order to construct the three-dimensional image, a specific device capable of displaying different images on the right and left eyes of the viewer is required. A representative example of the above-mentioned specific device is a three-dimensional display based on linear polarization capable of splitting an image into several units using a three-dimensional (3D) glass.

However, the above-mentioned 3D display based on the linear-polarization has a disadvantage in that the viewer must it must wear the 3D glass.

Therefore, in order to solve the above-mentioned problems, an improved 3D display system has been recently developed by connecting a specific element for splitting an image into several units according to individual directions to a flat panel display (e.g., an LCD or PDP).

The above-mentioned improved 3D display system has been developed by a variety of autography schemes, for example, a Parallax scheme, an Integral photography scheme based on a microlens array sheet, and a Holography scheme based on interference phenomenon, etc.

However, the above-mentioned Parallax 3D display system can display a three-dimensional image in a single direction (i.e., a horizontal direction or a vertical direction), such that the user or viewer is unable to view a desired three-dimensional image in a variety of directions.

Although the above-mentioned Integral-photography 3D display system or the above-mentioned Holography 3D display system can display a three-dimensional image in all directions, they have a very large amount of data to be processed, resulting in the occurrences of a complicated system and a great number of errors.

SUMMARY OF THE INVENTION

Accordingly, the present invention is directed to a system and method for displaying a three-dimensional image (3D) that substantially obviates one or more problems due to limitations and disadvantages of the related art.

An object of the present invention is to provide a system and method for displaying a three-dimensional (3D) image in a variety of directions.

Another object of the present invention is to provide a system and method for displaying a two-dimensional image or a three-dimensional image according to a command of a user.

Yet another object of the present invention is to provide a simplified 3D image display system and a method for the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a three-dimensional (3D) display system comprises: a display panel which includes a plurality of pixels, applies several-direction parallax image signals to the pixels according to regulations of a specific mode, and displays the several-direction parallax image signals; and a filter which is located at at least one of a front part and a rear part of the display panel, forms a predetermined barrier pattern according to regulations of the specific mode to implement a three-dimensional image, and separates the several-direction parallax image signals from each other.

Preferably, the specific is a first mode in which the display panel does not rotate or a second mode in which the display panel rotates by 90° on the basis of its center axis.

Preferably, the parallax image signals are two-direction parallax image signals or three-direction parallax image signals.

Preferably, the pixels neighbor with each other, such that different-direction parallax image signals are applied to the neighboring pixels.

Preferably, the pixels diagonally arranged in at least one diagonal direction receive parallax image signals having the same direction.

Preferably, the filter includes a plurality of areas, the areas are arranged to cope with the pixels, respectively, and are classified into transmission areas and non-transmission areas according to an external electric signal.

In another aspect of the present invention, there is provided a three-dimensional (3D) display system comprising: a light source for generating a light beam or an optical signal; an LCD panel which is located at a front part of the light source, samples/multiplexes several-direction parallax image signals, applies the resultant parallax image signals to corresponding pixels according to regulations of a selected selection mode, and displays the several-direction parallax image signals; and a liquid crystal filter which is located at at least one of a front part and a rear part of the display panel, forms a predetermined barrier pattern according to the specific-mode regulations to implement a three-dimensional image, and separates the several-direction parallax image signals from each other.

In yet another aspect of the present invention, there is provided a three-dimensional (3D) display method comprising: a) receiving several-direction parallax image signals; b) sampling/multiplexing the received several-direction parallax image signals, and forming several-direction parallax images; c) determining whether a first mode or a second mode is selected; and d) if the first mode or the second mode is selected, displaying the several-direction parallax images according to regulations of the first mode or the second mode, forms a predetermined barrier pattern, separating the several-direction parallax images from each other using the barrier pattern, and implementing a three-dimensional image.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that the 3D display system according to the present invention applies an image or video signal to a display panel according to specific-mode regulations, forms a barrier pattern in a filter according to the above-mentioned regulations, and simply configures a desired three-dimensional image, such that it can provide a user with the three-dimensional image in vertical and horizontal directions according to a selection command of the user.

Figure 1:
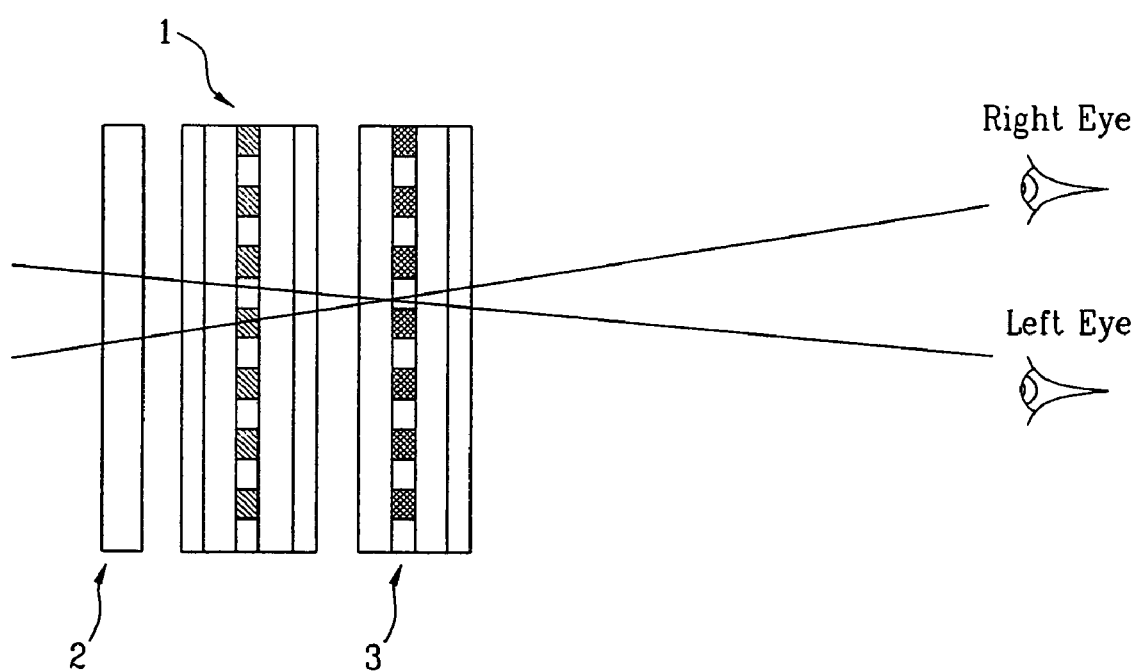
FIG. 1 is a conceptual diagram illustrating a three-dimensional display system according to the present invention.

FIG. 1 is a conceptual diagram illustrating a three-dimensional display system according to the present invention.

Referring to FIG. 1, the three-dimensional (3D) display system includes a display panel 1, a light source 2, and a filter 3.

As can be seen from FIG. 1, although an LCD is exemplarily used as the display panel 1, it should be noted that other displays (e.g., a PDP and an organic EL display) can also be applied to the present invention.

If the display panel 1 is determined to be a self-luminous display (e.g., the PDP or the organic EL display), the light source 2 may be omitted as necessary.

Although the filter 3 may be arranged in front of the display panel 1, it can also be arranged between the light source 2 and the display panel 1.

The display panel 1 includes a plurality of pixels, applies parallax image signals of several directions to corresponding pixels according to the specific-mode regulations, such that it displays a parallax image in a variety of directions.

In this case, the specific mode may be a first mode in which the display panel 1 does not rotate, or a second mode in which the display panel 1 rotates by 90 degrees (90°) on the basis of its center axis.

The parallax image signals applied to the display panel 1 may be two-direction parallax image signals or three-direction parallax image signals.

Neighboring pixels of the display panel 1 receive parallax image signals of different directions, respectively, and other pixels arranged in at least one diagonal direction receive parallax image signals having the same direction.

In the meantime, the filter 3 is arranged at at least one of a front part and a rear part of the display panel 1, forms a predetermined barrier pattern according to regulations of the specific mode, and separates parallax images of several directions from each other, thereby implementing a three-dimensional image.

In this case, the filter 3 includes a plurality of areas. The areas are arranged to cope with individual pixels, and may be classified into transmission areas and non-transmission areas according to external electric signals as necessary.

If the two-direction parallax image signals are applied to the display panel 1, the filter 3 forms a barrier pattern capable of positioning a single non-transmission area between the transmission areas. If the three-direction parallax image signals are applied to the display panel 1, the filter 3 forms a barrier pattern capable of positioning two non-transmission areas between the transmission areas.

For the convenience of description and better understanding of the present invention, the above-mentioned filter 3 exemplarily indicates a liquid crystal filter which is capable or incapable of transmitting a light beam (or an optical signal) to be received at a specific area according to the external electric signal.

The array of several-direction parallax images applied to the display panel and the barrier pattern of the filter will hereinafter be described with reference to the annexed drawings.

Figure 2A:
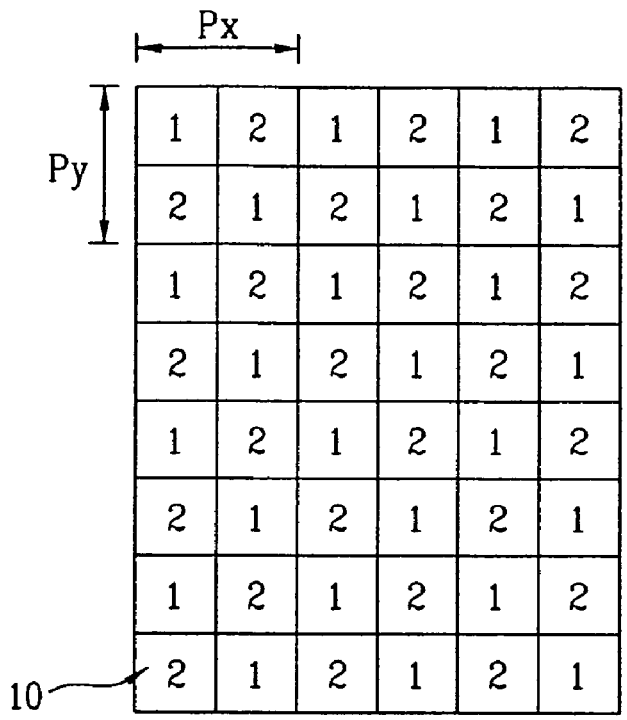
FIG. 2A is a structural diagram illustrating an array of two-direction parallax image signals applied to individual pixels of a display panel operated at a first mode according to the present invention.
Figure 3A:
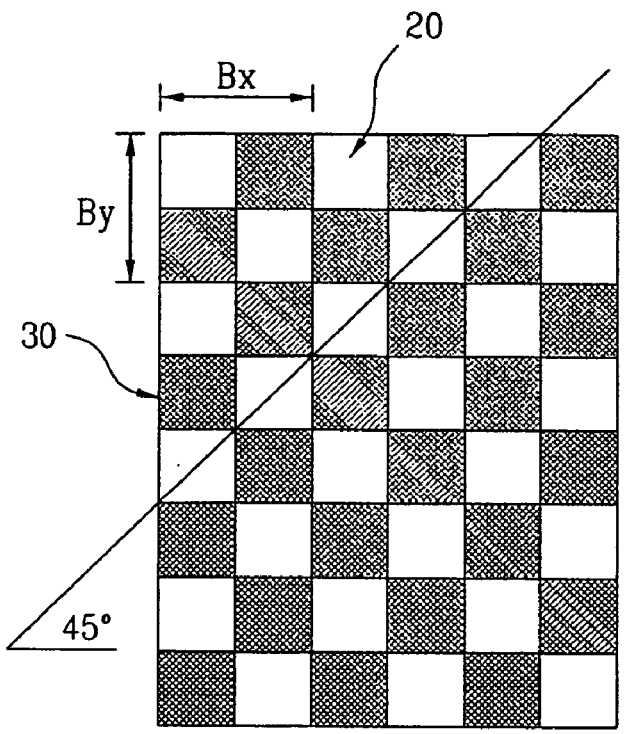
FIG. 3A is a structural diagram illustrating a barrier pattern of a filter capable of splitting the two-direction parallax image signal shown in FIG. 2A according to the present invention.

FIG. 2A is a structural diagram illustrating an array of two-direction parallax image signals applied to individual pixels of a display panel operated in a first mode according to the present invention. FIG. 3A is a structural diagram illustrating a barrier pattern of a filter capable of splitting the two-direction parallax image signal shown in FIG. 2A according to the present invention.

If a user selects the first mode, the 3D display system according to the present invention will be operated as follows.

In this case, the first mode indicates a vertical mode in which the display panel does not rotate.

If the display panel enters the vertical mode, the height of the display panel is greater than the width of the same.

In other words, FIGS. 2A and 3A show a specific case in which the user selects the first mode and the two-direction parallax image signals are applied to the display panel.

As can be seen from FIG. 2A, the display panel applies the two-direction parallax image signals to corresponding pixels 10, and displays the two-direction parallax image.

In this case, in the case of pixels 10 diagonally neighboring a single pixel 10 of the display panel, parallax image signals of the same direction are applied to the neighboring pixels 10 as the above-mentioned two-direction parallax image signals. In the case of other pixels 10 horizontally or vertically neighboring the single pixel 10, different-direction parallax-image signals are applied to the pixels 10. In this way, the regulations of the first mode are implemented.

As can be seen from FIG. 3A, the filter forms a specific barrier pattern to separate two-direction parallax images from each other, such that the two-direction parallax images displayed on the display panel can implement a three-dimensional image.

In this case, the barrier pattern has a predetermined regulation that a single non-transmission area 30 is positioned between the transmission areas 20.

The display panel having received the two-direction parallax image signals receives the same-direction parallax image signals at its pixels 10 arranged at 45° in a horizontal direction from among two diagonal directions, and receives the same-direction parallax image signals at other pixels 10 arranged at 135° in a horizontal direction from among two diagonal directions.

Next, if the user selects the second mode, the 3D display system according to the present invention will be operated as follows.

In this case, the second mode indicates a horizontal mode in which the display panel rotates by 90° on the basis of a center axis.

If the display panel enters the horizontal mode, the width of the display panel is greater than the height of the same.

If the user selects the second mode and applies the two-direction parallax image signal to the display panel, the 3D display system has the same regulations as those of FIGS. 2A and 3A, such that a detailed description thereof will here in be omitted for the convenience of description.

Figure 2B:
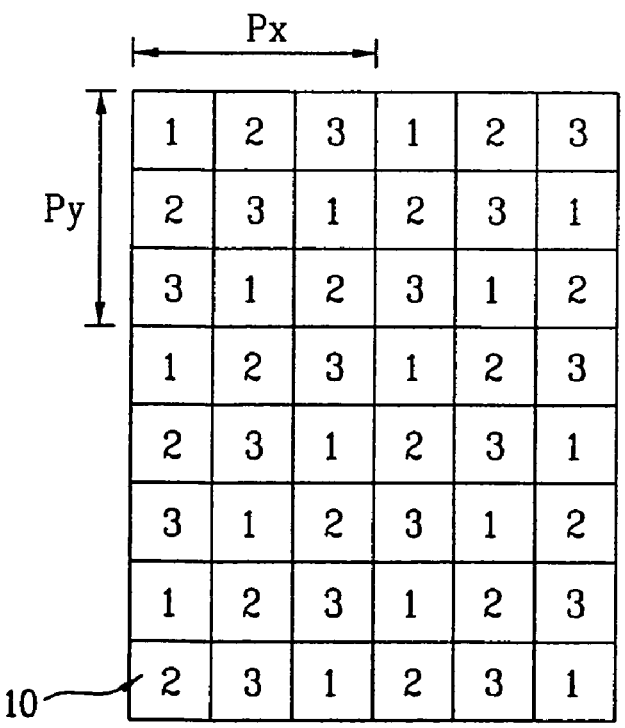
FIG. 2B is a structural diagram illustrating an array of three-direction parallax image signals applied to individual pixels of a display panel operated in a first mode according to the present invention.
Figure 3B:
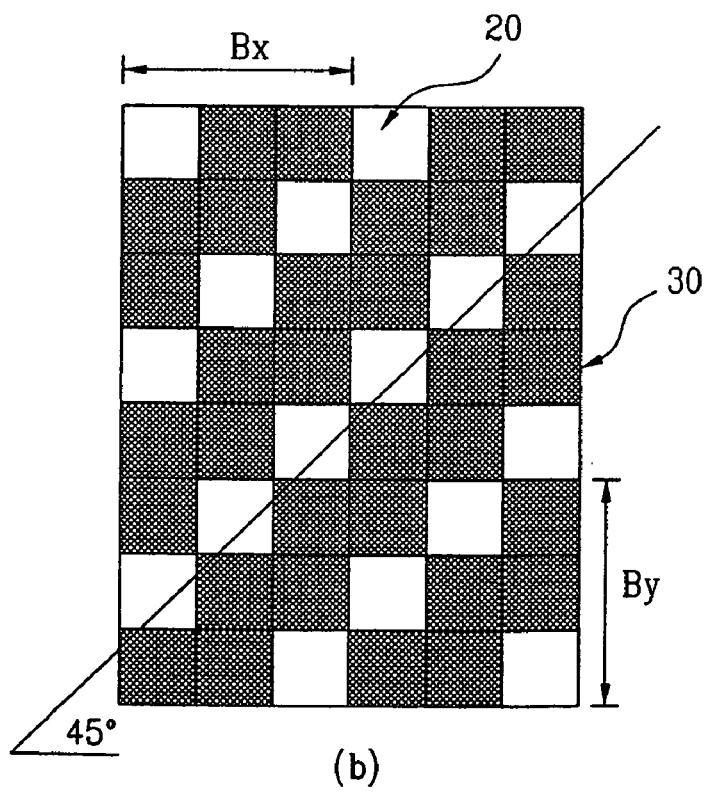
FIG. 3B is a structural diagram illustrating a barrier pattern of a filter capable of splitting the three-direction parallax image signal shown in FIG. 2B according to the present invention.

FIG. 2B is a structural diagram illustrating an array of three-direction parallax image signals applied to individual pixels of a display panel operated in a first mode according to the present invention. FIG. 3B is a structural diagram illustrating a barrier pattern of a filter capable of splitting the three-direction parallax image signal shown in FIG. 2B according to the present invention.

As can be seen from FIG. 2B, the display panel applies the three-direction parallax image signals to corresponding pixels 10, and displays the three-direction parallax image.

In this case, in the case of pixels 10 diagonally neighboring a single pixel 10 of the display panel, parallax image signals of the same direction are applied to the neighboring pixels 10 as the above-mentioned three-direction parallax image signals. In the case of other pixels 10 horizontally or vertically neighboring the single pixel 10, different-direction parallax image signals are applied to the pixels 10. In this way, the regulations of the second mode are implemented.

As can be seen from FIG. 3B, the filter forms a specific barrier pattern to separate three-direction parallax images from each other, such that the three-direction parallax images displayed on the display panel can implement a three-dimensional image.

In this case, the barrier pattern has a predetermined regulation that two non-transmission areas 30 are positioned between the transmission areas 20.

The display panel having received the three-direction parallax image signals receives the same-direction parallax image signals at its pixels 10 arranged at 45° in a horizontal direction from among two diagonal directions, and receives the same-direction parallax image signals at other pixels 10 arranged at 135° in a horizontal direction from among two diagonal directions.

Next, detailed descriptions of the second mode selected by the user will hereinafter be described.

In this case, the second mode indicates a horizontal mode in which the display panel rotates by 90° on the basis of a center axis.

If the display panel enters the horizontal mode, the width of the display panel is greater than the height of the same.

Figures 4A, 4B:
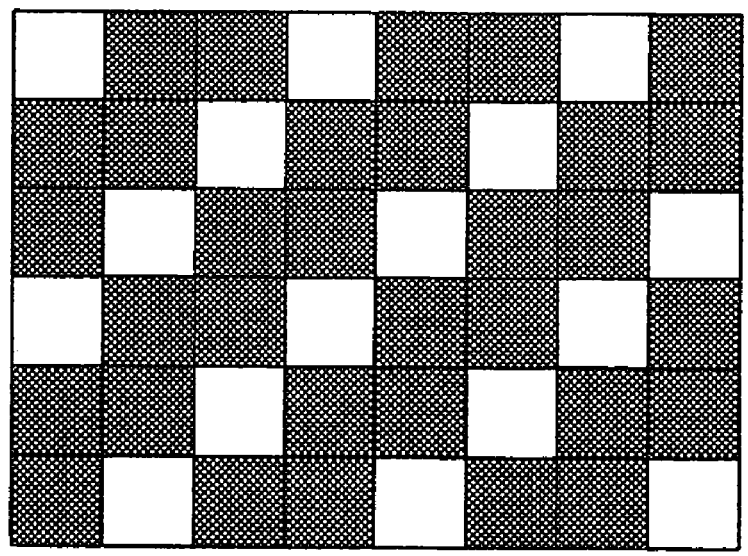
FIG. 4A is a structural diagram illustrating an array of three-direction parallax image signals applied to individual pixels of a display panel operated in a second mode according to the present invention.
FIG. 4B is a structural diagram illustrating a barrier pattern of a filter capable of splitting the three-direction parallax image signal shown in FIG. 4A according to the present invention.

If the user selects the second mode and applies the three-direction parallax image signal to the display panel, the 3D display system has the same regulations as those of FIGS. 4A and 4B, such that a detailed description thereof will herein be omitted for the convenience of description.

FIG. 4A is a structural diagram illustrating an array of three-direction parallax image signals applied to individual pixels of a display panel operated in a second mode according to the present invention. FIG. 4B is a structural diagram illustrating a barrier pattern of a filter capable of splitting the three-direction parallax image signal shown in FIG. 4A according to the present invention.

A method for displaying a three-dimensional image according to the present invention will hereinafter be described with reference to FIG. 5.

Figure 5:
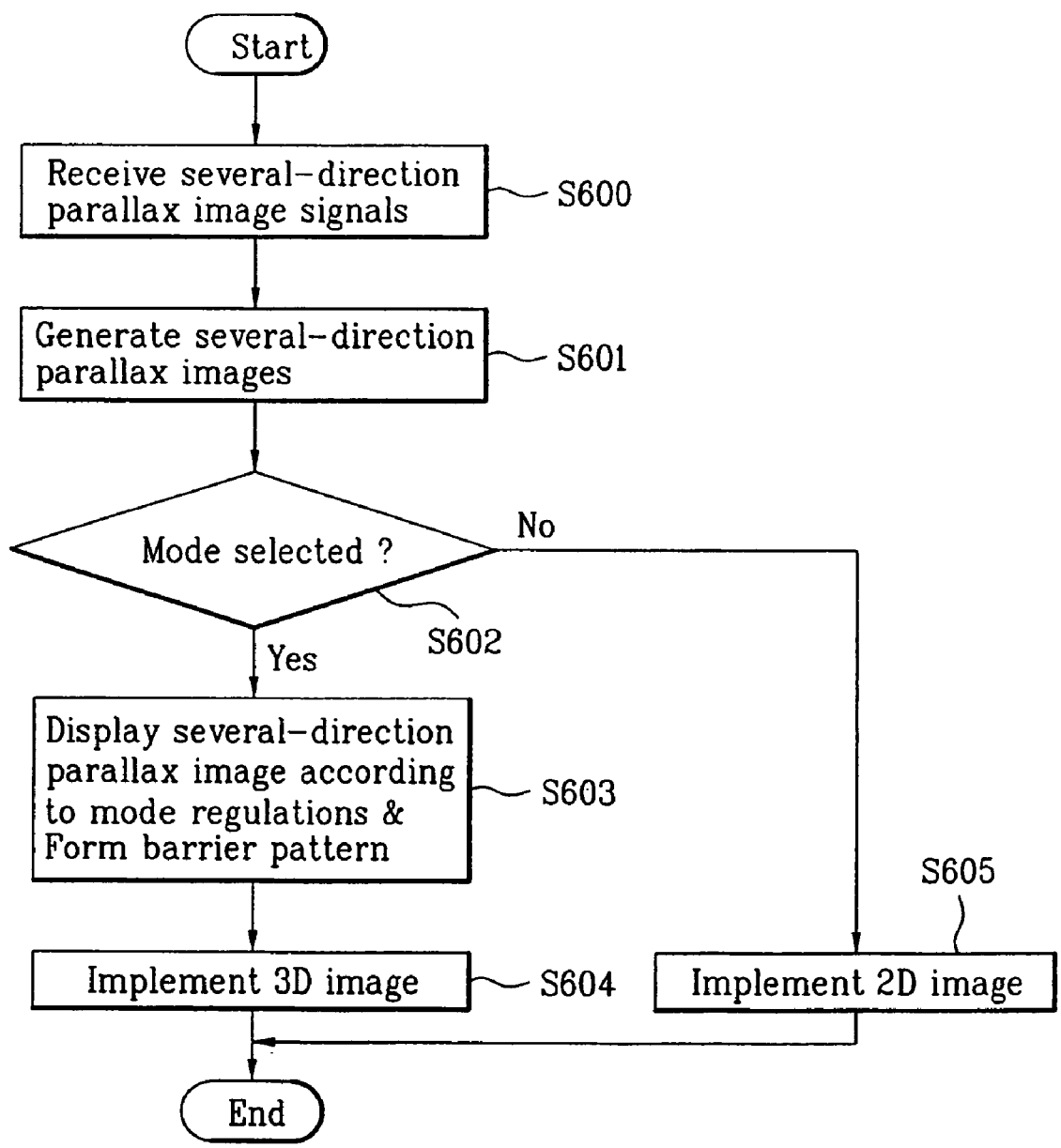
FIG. 5 is a flow chart illustrating a method for displaying a three-dimensional image according to the present invention.

FIG. 5 is a flow chart illustrating a method for displaying a three-dimensional image according to the present invention.

Referring to FIG. 5, the 3D display system according to the present invention receives parallax image signals in several directions at step S600.

The 3D display system performs sampling the received several-direction parallax image signals, performs multiplexing of the sampled parallax image signals, and forms parallax images of several directions at step S601.

The 3D display system determines whether the user selects the first mode or the second mode at step S602.

If the first mode or the second mode is selected by the user at step S602, the 3D display system displays the several-direction parallax images on the display panel according to the first-mode regulations or the second-mode regulations, and forms a predetermined barrier pattern in the filter to separate the several-direction parallax images from each other at step S603, such that it implements a three-dimensional image at step S604.

If the first mode or the second mode is not selected by the user at step S602, the 3D display system allows all the areas to be transparent to implement a two-dimensional image, and transmits the image displayed on the display panel without any change at step S605.

In this case, the several-direction parallax image may be a specific image captured by either the 2-view scheme or the 3-view scheme as necessary.

The 3D display system can display a three-dimensional image as described above, such that it can be applied to a mobile communication terminal.

A mobile communication terminal includes a display. The display of the mobile communication terminal generally includes a display panel, a backlight, and a switching 3D filter panel.

The display panel receives 2D or 3D image signals at its pixels, and displays the 2D or 3D image according to the received 2D or 3D image signals, such that the user can view the 2D or 3D image via a light beam (or optical signal) generated from the backlight 2.

In the case of the 2D mode, the switching 3D filter panel allows overall parts of the filter panel to be transparent, such that it transmits the 2D image of the display panel without any change.

In the case of the 3D mode, the switching 3D filter panel forms a specific barrier pattern to provide the user with a desired three-dimensional image, and spatially splits the several-direction parallax image into a left-eye image and a right-eye image, such that it displays the three-dimensional image.

The mobile communication terminal displays the three-dimensional image in a horizontal or vertical direction according to categories of content data.

In the case of displaying the three-dimensional image in the vertical direction, the 3D display system applies the same-direction parallax image signals to pixels which are arranged at 45° on the basis of the horizontal direction of the display panel, as shown in FIGS. 2A and 2B.

The numbers "1", "2", and "3" of FIGS. 2A and 2B indicate that parallax image signals of individual directions are applied to the pixels. The parallax images of the individual directions are sampled and multiplexed, such that the resultant images are arranged at the pixels of the display panel.

FIG. 2A is a structural diagram illustrating a pixel array for separating the two-direction parallax image signals from each other according to the 3-view scheme, and the separated image signals are applied to their corresponding pixels. FIG. 2B is a structural diagram illustrating a pixel array for separating the three-direction parallax image signals from each other according to the 3-view scheme, and the separated image signals are applied to their corresponding pixels.

In the case of the vertical direction (i.e., a vertical format), the 3D filter barrier pattern corresponding to the 2-view scheme is depicted in FIG. 3A, and the 3D filter barrier pattern corresponding to the 3-view scheme is depicted in FIG. 3B.

Transmission areas capable of transmitting a light beam are arranged in a direction of 45° as shown in FIGS. 3A and 3B. The barrier patterns are designed to have the same horizontal period and the same vertical period, such that the transmission areas can be available for the horizontal and vertical formats using a single barrier pattern. The above-mentioned description of the barrier patterns can be represented by the following equation:

$$Px = Py \quad \text{[Equation]}$$
$$Bx = By$$

where Px is a horizontal period during which parallax image signals of individual directions are applied to pixels, Py is a vertical period during which parallax image signals of individual directions are applied to pixels, Bx is a barrier-pattern horizontal period according to parallax image signals of individual directions, and By is a barrier-pattern vertical period according to parallax image signals of individual directions.

In this way, the 3D display system according to the present invention can be applied to the mobile communication terminal.

As apparent from the above description, the 3D display system according to the present invention can display a three-dimensional image in a variety of directions (e.g., horizontal and vertical directions).

The 3D display system according to the present invention can display a 2D image or a 3D image according to a selection command of a user, such that the system configuration can be simplified and be manufactured at low costs.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A three-dimensional (3-D) display system comprising:
    a display panel displaying one of a two-dimensional (2-D) image, a first three-dimensional (3-D) image having a vertical format, and a second three-dimensional (3-D) image having a horizontal format; and
    a filter arranged on a first side or a second side of the display panel,
    wherein the filter transmits the 2-D image when the display panel displays the 2-D image,
    the filter forms a first barrier pattern corresponding to the 3-D image having the vertical format when the display panel displays the 3-D image having the vertical format, and
    the filter forms a second barrier pattern corresponding to the 3-D image having the horizontal format when the display panel displays the 3-D image having the horizontal format, wherein the second barrier pattern is symmetric to the pattern of 90 degrees tilted the first barrier pattern such that the vertical format and the horizontal format are realized by forming one barrier pattern,
    wherein a vertical period and a horizontal period of the first barrier pattern are substantially equal to those of the second barrier pattern,
    and wherein the 3-D image comprises an image of two-view scheme or an image of three-view scheme.

2. The three-dimensional (3-D) display system according to claim 1, wherein the filter includes a plurality of areas arranged to correspond to pixels of the display panel, respectively.

3. The three-dimensional (3-D) display system according to claim 2, wherein the plurality of areas include transmission areas and non-transmission areas according to the first barrier pattern or the second barrier pattern.

4. The three-dimensional (3-D) display system according to claim 3, wherein a single non transmission area is positioned between the transmission areas, or two non-transmission areas are positioned between the transmission areas.

5. The three-dimensional (3-D) display system according to claim 1, wherein the display panel includes a liquid crystal display (LCD) panel.

6. The three-dimensional (3-D) display system according to claim 1, wherein the filter includes a liquid crystal filter.

7. The three-dimensional (3-D) display system according to claim 1, wherein the display panel is a display panel of a mobile communication terminal.

8. The three-dimensional (3-D) display system according to claim 1 wherein the filter forms the first barrier pattern and the second barrier pattern according to the image of two-view scheme or the image of three-view scheme, respectively.

* * * * *